(12) United States Patent
Hesse

(10) Patent No.: US 6,913,067 B2
(45) Date of Patent: Jul. 5, 2005

(54) VEHICLE CONDITIONING SYSTEM

(75) Inventor: Ullrich Hesse, Affalterbach (DE)

(73) Assignee: Zexel Valeo Compressor Europe GmbH, Ludwigsburg (DE)

(*) Notice: Subject to any disclaimer, the term of this patent is extended or adjusted under 35 U.S.C. 154(b) by 0 days.

(21) Appl. No.: 10/370,558

(22) Filed: Feb. 20, 2003

(65) Prior Publication Data

US 2003/0177778 A1 Sep. 25, 2003

(30) Foreign Application Priority Data

Feb. 20, 2002 (DE) .......................................... 102 07 128

(51) Int. Cl.⁷ .......................... F25B 29/00; B60H 1/32; B60H 1/22
(52) U.S. Cl. ........................ 165/43; 165/42; 165/202; 62/238.6; 62/113; 62/114; 62/513; 62/196.4; 62/323.1; 237/2 B
(58) Field of Search ................................ 165/201, 202, 165/43, 42, 240; 62/513, 238.6, 113, 114, 196.4, 323.1; 237/2 B (56) References Cited

U.S. PATENT DOCUMENTS

| | | | | |
|---|---|---|---|---|
| 3,446,032 A | * | 5/1969 | Bottum | 62/513 |
| 6,047,770 A | * | 4/2000 | Suzuki et al. | 165/202 |
| 6,386,277 B1 | * | 5/2002 | Wattelet et al. | 62/513 |

FOREIGN PATENT DOCUMENTS

JP 6-323637 * 11/1994

* cited by examiner

Primary Examiner—John K. Ford
(74) Attorney, Agent, or Firm—Andrus, Sceales, Starke & Sawall, LLP (57) ABSTRACT

Vehicle air-conditioning system, in particular $CO_2$ air conditioner, the refrigerant cycle of which comprises the following components: a compressor, a refrigerant cooler, an internal heat exchanger between the refrigerant-cooler side and the evaporator side, an expansion valve, and an evaporator. To switch the air-conditioning system from cooling-mode operation to heating-mode operation, between the compressor and the refrigerant cooler there is integrated an auxiliary heat exchanger corresponding to a cooling circulation on the engine side, such that downstream of the auxiliary heat exchanger there is disposed an expansion valve by means of which during heating-mode operation the refrigerant can be throttled to a lower pressure.

1 Claim, 7 Drawing Sheets

PRIOR ART

FIG. 7

VEHICLE CONDITIONING SYSTEM

FIELD OF THE INVENTION

The invention relates to a vehicle air-conditioning system, in particular a $CO_2$ air conditioner, the refrigerant cycle of which comprises the following components: compressor, refrigerant cooler, internal heat exchanger between the heating-cycle heat exchanger and the evaporator side of the arrangement, expansion valve, and evaporator.

BACKGROUND OF THE INVENTION

Air-conditioning systems for vehicles are generally known. They serve primarily to cool the vehicle's passenger space in the summer and are unsuitable for operation in the winter. However, in modern automobiles with engines having low fuel consumption, the heat produced by the engine is insufficient for passenger comfort in the winter. In such vehicles, in particular, to remedy this problem auxiliary heaters are supplied as standard. In principle, it is also possible to use air conditioners for auxiliary heating, i.e., to operate them in a so-called heat-pump arrangement. This, of course, amounts to a reversal of the function of conventional air conditioners employing R 134a as the refrigerant. In order to operate conventional air conditioners as heat pumps, a relatively elaborate rearrangement of the circulation and control means is required. Furthermore, the heat output, in particular at very low outdoor temperatures, is unsatisfactory, because the vaporization pressure depends on the temperature and can fall below the atmospheric pressure. Hence, the suction density and converted output are corresponding low.

SUMMARY OF THE INVENTION

When $CO_2$ is used as a refrigerant the situation can be improved. Studies have shown that a heat pump operated with $CO_2$ can achieve a higher heat output. Furthermore, the circulation arrangement is considerably simpler than in the case of R 134a air-conditioning systems.

Figure 7:
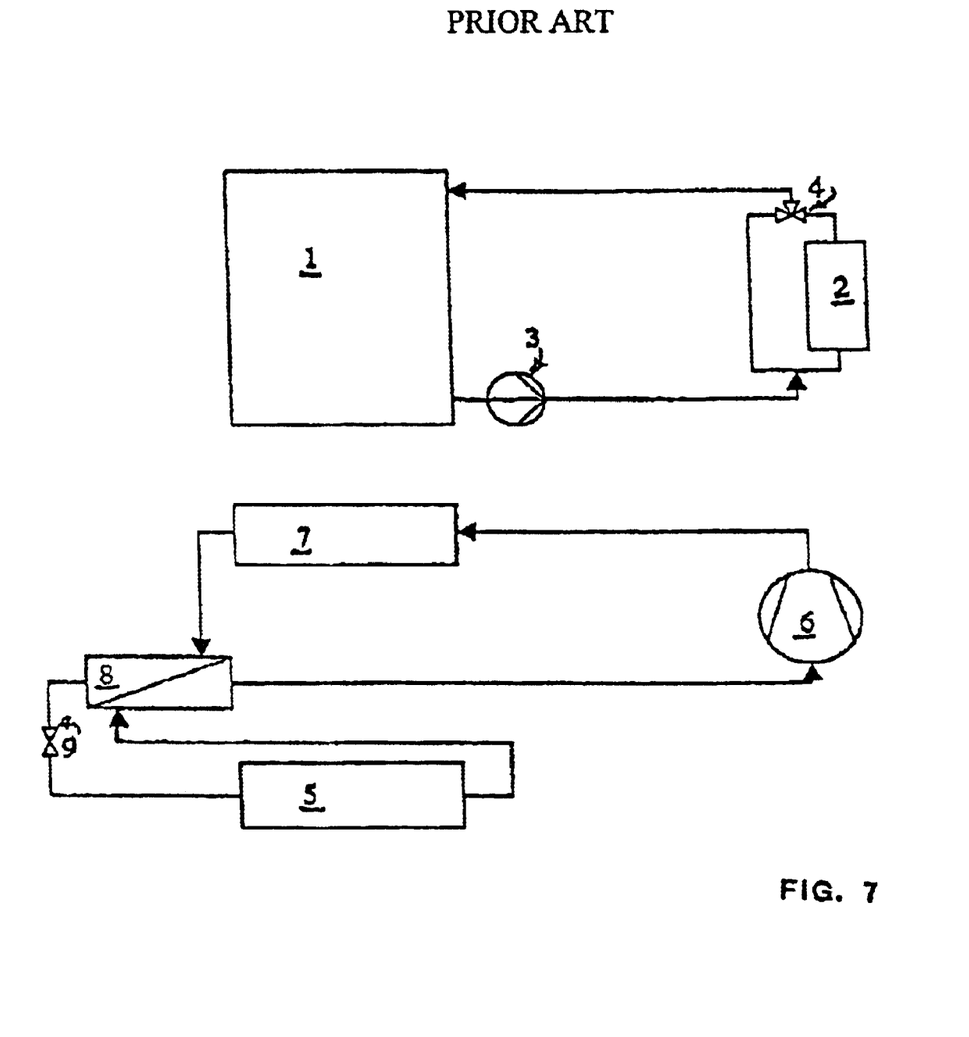
FIG. 7 shows a prior art vehicle air-conditioning system.

The starting point for the present invention is the circulation arrangement conventionally used for heating an automobile, on the one hand, and, on the other hand, a refrigerant circulation for a $CO_2$ air conditioner as shown in FIG. 7. FIG. 7 shows a possible arrangement of the circulation for heating a motor vehicle as well as the system diagram, i.e., the refrigerant circulation, of a $CO_2$ air conditioner designed exclusively for the purpose of cooling. The heating cycle comprises an engine 1, a heat exchanger 2, a circulator pump 3 (which ordinarily is the main water pump associated with the engine 1), and a two-way valve 4. For the refrigerant circulation, the main components are shown, namely an evaporator 5, a compressor 6, a refrigerant cooler 7, an internal heat exchanger 8 and an expansion valve 9. The heat exchanger 2 for heating purposes can be eliminated from the circuit by way of a bypass conduit, so disposed that the two-way valve 4 is positioned between this bypass conduit and the heat exchanger 2, in particular the outlet of the latter. By suitable switching of this valve, the water that cools the engine can be conducted either through the heat exchanger 2 or around it.

The known air conditioner, shown in FIG. 7, cannot be operated as a heater.

Taking this state of the art as a point of departure, along with the state of the art described at the outset in connection with R 134a air-conditioning systems, it is the objective of the present invention to create a vehicle air-conditioning system, in particular a $CO_2$ air conditioner, which with no great increase in complexity can be converted from cooling operation to heating operation and the reverse.

So that a cooling arrangement according to the state of the art, shown in FIG. 7, can additionally be made usable for operation as heater, all that is required in accordance with the invention is to provide between compressor and refrigerant cooler an additional heat exchanger, corresponding to the cooling-water circulation on the engine side. Downstream of this additional heat exchanger is disposed an expansion valve, by means of which the pressure of the refrigerant can be reduced when the system is being operated as a heater, preferably from an initial refrigerant-compressor pressure of ca. 70–120 bar to, for instance, about 20 bar, depending on the outside temperature. During conventional cooling operation, means are provided to bypass the expansion valve in accordance with the invention.

BRIEF DESCRIPTION OF THE DRAWINGS

In the following, two preferred exemplary embodiments of the invention are described in detail with reference to the attached drawings, wherein.

DETAILED DESCRIPTION OF THE INVENTION

Figure 1:
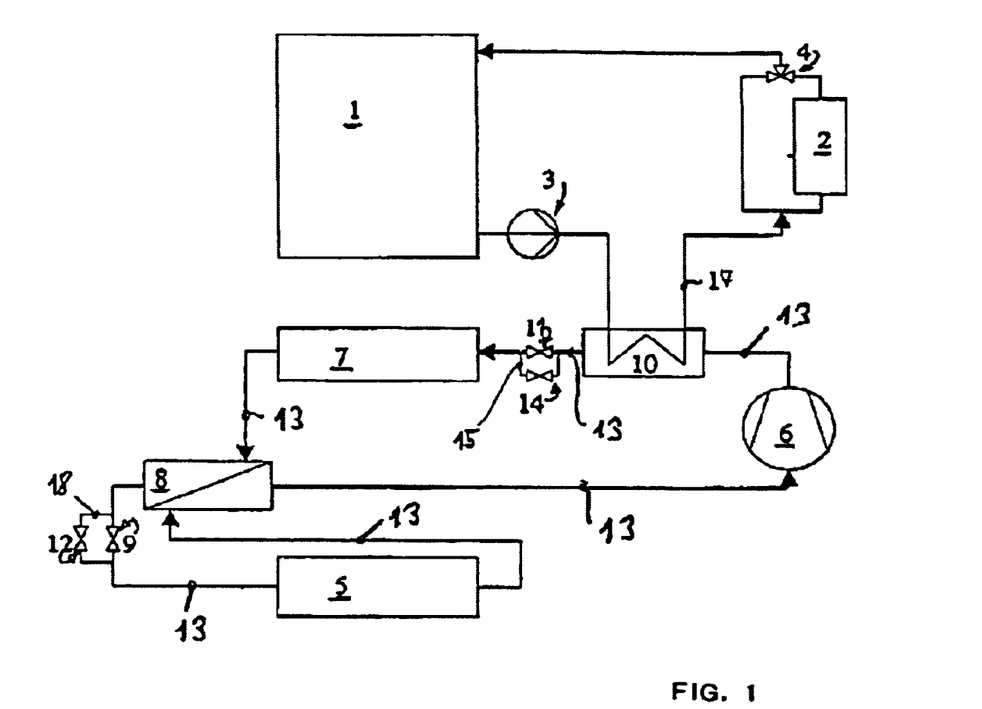
FIG. 1 shows a first embodiment (circuit diagram) of a vehicle air-conditioning system in accordance with the invention.

The air-conditioning system according to FIG. 1 has been modified with respect to that according to the state of the art, as shown in FIG. 7, in such a way as to enable a heating function of the air conditioner, which in this case operates as a heat pump. For this purpose, an auxiliary heat exchanger 10 is provided, which is incorporated into the cycle in order to extract heat from the gaseous refrigerant and to transfer the heat to the water that circulates to cool the engine. The circulation of the cooling water is indicated by the reference numeral 17. In the auxiliary heat exchanger 10, therefore, heat exchange occurs between the gaseous refrigerant cycle and the cooling-water cycle on the engine side. The refrigerant gas, namely $CO_2$, has been heated to a high temperature and is delivered from a compressor 6 positioned upstream of the heat exchanger 10. Downstream of the auxiliary heat exchanger 10 is disposed an expansion valve 14, by means of which the pressure of the refrigerant gas can be lowered during heating-mode operation. More specifically, the expansion valve 14 is situated in a bypass conduit that branches off from the refrigerant conduit 13 between the auxiliary heat exchanger 10 and the refrigerant cooler 7. This bypass conduit is identified by the reference numeral 15. It is disposed in parallel to the above-mentioned refrigerant conduit and provides a detour around a shut-off valve 11 disposed therein. The shut-off valve 11 serves to block the otherwise free passage of refrigerant between the auxiliary heat exchanger 10 and the refrigerant cooler 7. When the valve 11 is in the closed position, the expansion valve 14 is active, reducing the pressure of the refrigerant far enough that the heat exchanger 7, which in air-conditioning mode serves to lower the temperature of the refrigerant, now operates as an evaporator to take up ambient warmth in heating mode.

It should also be mentioned that another expansion valve 9 is disposed in the refrigerant circulation, between the internal heat exchanger 8 and the evaporator 5 disposed downstream of the latter; associated with this additional expansion valve is a bypass conduit 18 with shut-off valve 12, which is employed during heating-mode operation. That is, when the system is used for heating, the otherwise active expansion valve 9 is bypassed by opening the shut-off valve 12 and allowing flow through the conduit 18.

The operation in heating mode proceeds as follows:

The compressor 6 compresses the refrigerant, namely $CO_2$, to a high final pressure of about 80–120 bar. The temperatures at the end of compression are intentionally kept high, so that in the auxiliary heat exchanger 10 sufficient heat can be transferred to the hot-water circulation 17 on the engine side, and this heat is then provided to the passenger compartment by way of the heat exchanger 2. The refrigerant, i.e., $CO_2$, then passes through the expansion valve 14 that follows the heat exchanger 10, is thereby reduced to a lower pressure of, e.g., about 20 bar, so that it is in the wet-steam range, and in the refrigerant cooler 7 it vaporizes at lower temperatures. In the process, the refrigerant takes up heat from the surroundings. It then passes through the internal heat exchanger 8 and the evaporator 5 with no appreciable heat exchange. The flow through the valve 12 occurs with practically no loss of pressure and hence without change in the degree of compression.

Operation in cooling mode:

In the evaporator 5 the refrigerant vaporizes and, in the process, extracts heat from the ambient air that is flowing to the passenger compartment. The gaseous refrigerant subsequently sucked into the internal heat exchanger 8 is superheated and sent to the compressor 6. There the refrigerant is compressed until its pressure reaches, e.g., 70–120 bar, and at the end of this process its temperature has risen to 150° C. or more. The refrigerant next enters the auxiliary heat exchanger 10, where some of this heat is removed, and flows through the opened shut-off valve 11 into the downstream refrigerant cooler 7; having been energetically pre-cooled, the refrigerant needs only a partial further cooling in the cooler 7. The refrigerant is then supercooled in the internal heat exchanger 8, and in the expansion valve 9 the vaporization pressure is restored. During the cooling process the shut-off valve 12 in the bypass conduit 18 is closed. It is energetically advantageous that both the auxiliary heat exchanger 10 and the refrigerant cooler 7 are available for lowering the temperature of the refrigerant, i.e., $CO_2$ gas. This arrangement makes the operation of the system in cooling mode energetically more favorable than is a purely cooling circulation arrangement as shown in FIG. 7. This side effect can be exploited in order to provide a more economical refrigerant cooler, or to improve the energetic efficiency of the installation as a whole. The heat transferred to the cooling-water circulation 17 by the auxiliary heat exchanger 10 can be supplied directly to the engine 1 by way of the bypass around the heat exchanger 2. When the engine is idling, lightly loaded or warming up, this supplied heat serves to keep the engine at an energetically favorable operating temperature and thus to save fuel. Once the engine has become appropriately warm, the extra heat is dissipated by way of the radiator supplied for engine cooling (not shown here).

Hence such a heat exchanger, disposed downstream of the compressor and in contact with the water used to cool the engine, is also advantageous for a $CO_2$ air-conditioning system that does not have a heating function. In this case no additional valves are needed, but only the heat exchanger that is used to remove heat. This version is regarded and claimed as a variant in accordance with the invention.

If the engine is operated at the limits of its thermal range, as is the case when traveling at high speed under a heavy load, the flow of ambient air through the refrigerant cooler 7 is sufficient to make the condensation pressure low enough, and the temperature at the end of the condensation is likewise low. In this case the engine-cooling water is already hot, and because of the slight or even negative temperature difference there is no longer any transfer of heat from the auxiliary heat exchanger 10 to the cooling water. This means that an additional thermal load is no longer imposed on the engine. Hence the engine radiator does not need to have larger dimensions.

Residual heat, i.e., the heat not delivered to the passenger compartment during operation in heating mode, serves as a supplementary supply of heat to a cold engine, bringing the latter up to an energetically favorable operating temperature.

Figure 2:
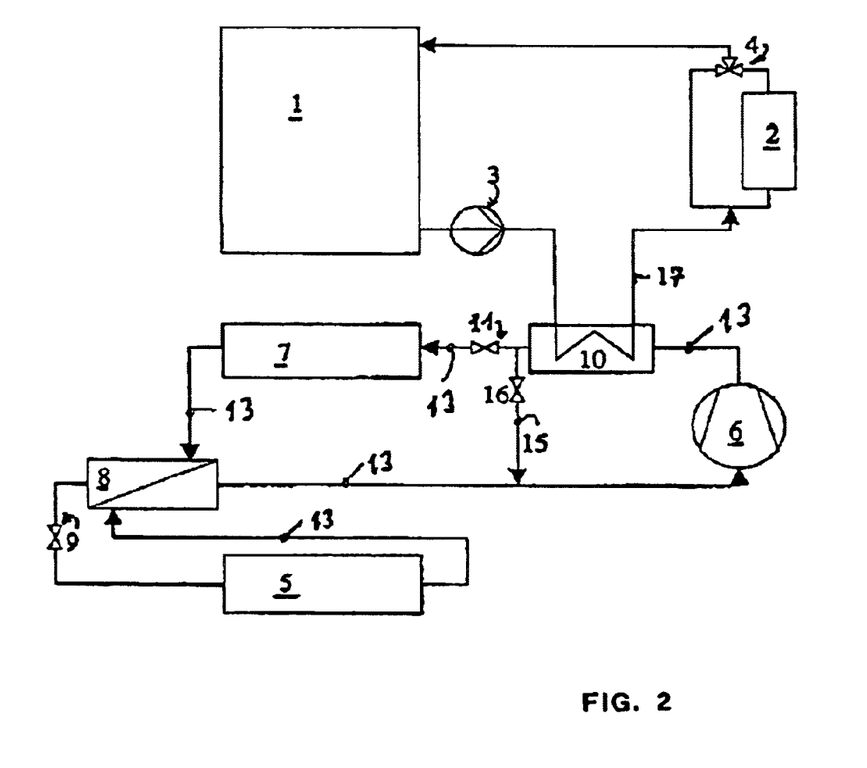
FIG. 2 shows a second embodiment (circuit diagram) of a vehicle air-conditioning system in accordance with the invention.

A distinctive feature of the variant shown in FIG. 2 is that between the auxiliary heat exchanger 10 and refrigerant cooler 7 a bypass conduit 15 branches off from the refrigerant conduit 13, at a point upstream of a shut-off valve 11 disposed in said refrigerant conduit 13. The bypass conduit 15 is in direct fluid communication with the input side of the compressor 6; that is, it forms a bridge to bypass the remainder of the refrigerant circulation system.

In this embodiment it is not necessary to provide a bypass around the additional expansion valve 9 between the internal heat exchanger 8 and evaporator 5.

In the bypass conduit 15 an expansion valve 16 is disposed. The embodiment according to FIG. 2 is thus characterized by a hot-gas bypass circulation during heating-mode operation, because of the direct connection between the point at which the refrigerant leaves the auxiliary heat exchanger 10 and the input to the compressor 6. The output from the auxiliary heat exchanger 10 corresponds to the heat taken in by the compressor 6. No heat-pump operation involving the input of additional heat from the surroundings is involved. The expansion valve 16 must be closed during normal cooling-mode operation. It is also conceivable to design the bypass conduit 15 in the embodiment according to FIG. 2 as a capillary with a sufficient throttling action. In this case it would suffice to use a simple shut-off valve for the valve 16. As has been mentioned, it is possible to eliminate the shut-off valve 12 provided for bypassing the expansion valve 9 between internal heat exchanger 8 and evaporator 5. Problems with ice formation, which cannot be entirely ruled out on the air side of the refrigerant cooler 7, can be avoided with this circulation arrangement, which gives it an advantage over others. Furthermore, problems that might be introduced by ice formation and residual moisture at the evaporator 5 can be avoided.

It should also be mentioned at this juncture that heat-pump circuits based on a simple reversal of circulation often lead to problems because during operation as an air conditioner, residual moisture can be left on the surface of the evaporator. That is, when such an installation is switched from cooling-mode to heating-mode operation, so that the evaporator 5 is now used for heating, this moisture is released and can suddenly be deposited on the vehicle's windows, with consequences for safety. This phenomenon has been called "flash-fogging." The production of offensive odors is also conceivable.

In the installations or circulation systems described herein the above-mentioned problems are excluded, because the evaporator 5 is always kept cool and the heat is transferred to the heat exchanger, which is in contact with the circulating water. Depending on the design and control of the valves, it is also possible for the circulation systems described here to be operated in a mode specifically intended for demoisturizing, such that moisture is removed in the evaporator 5 and subsequent heating occurs in the heat exchanger 2.

It should further be mentioned as an additional advantage that, in contrast to the situation in known heat-pump circuits with $CO_2$ as refrigerant that use the cooling water from the engine as heat source, in the present case no heat is withdrawn from the cooling water. Hence, the engine heats up as rapidly as possible eliminating the need for supplementary heating at an advantageously early stage.

Figure 3:
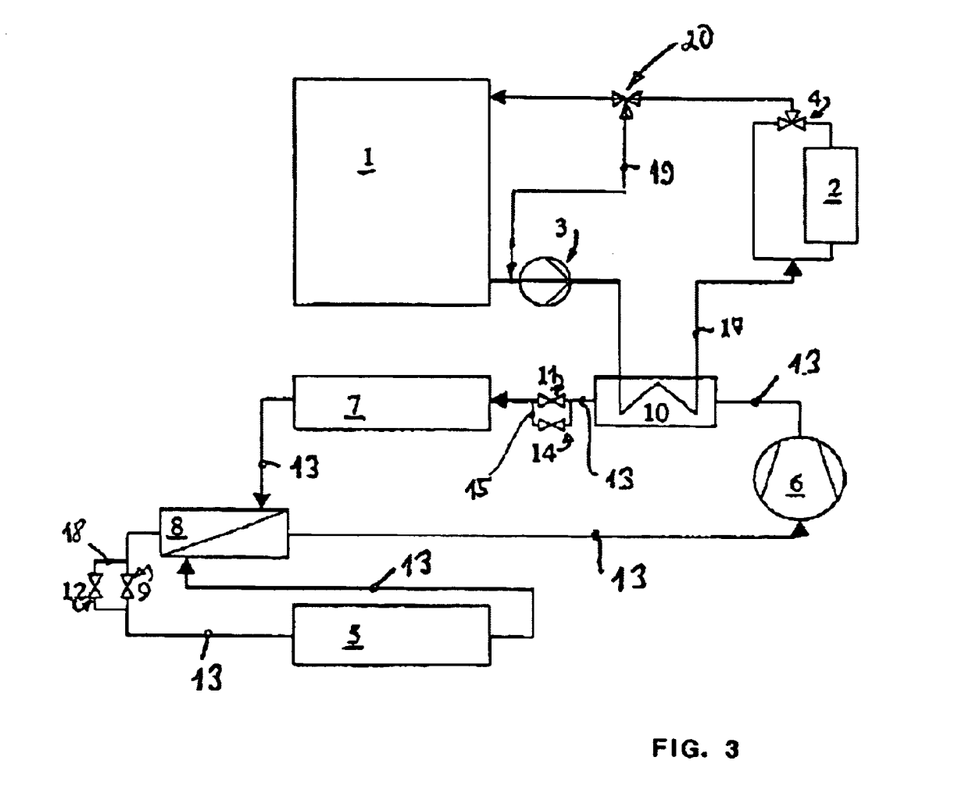
FIGS. 3 to 6 show additional modifications (circuit diagrams) of a vehicle air-conditioning system in accordance with the invention.
Figure 4:
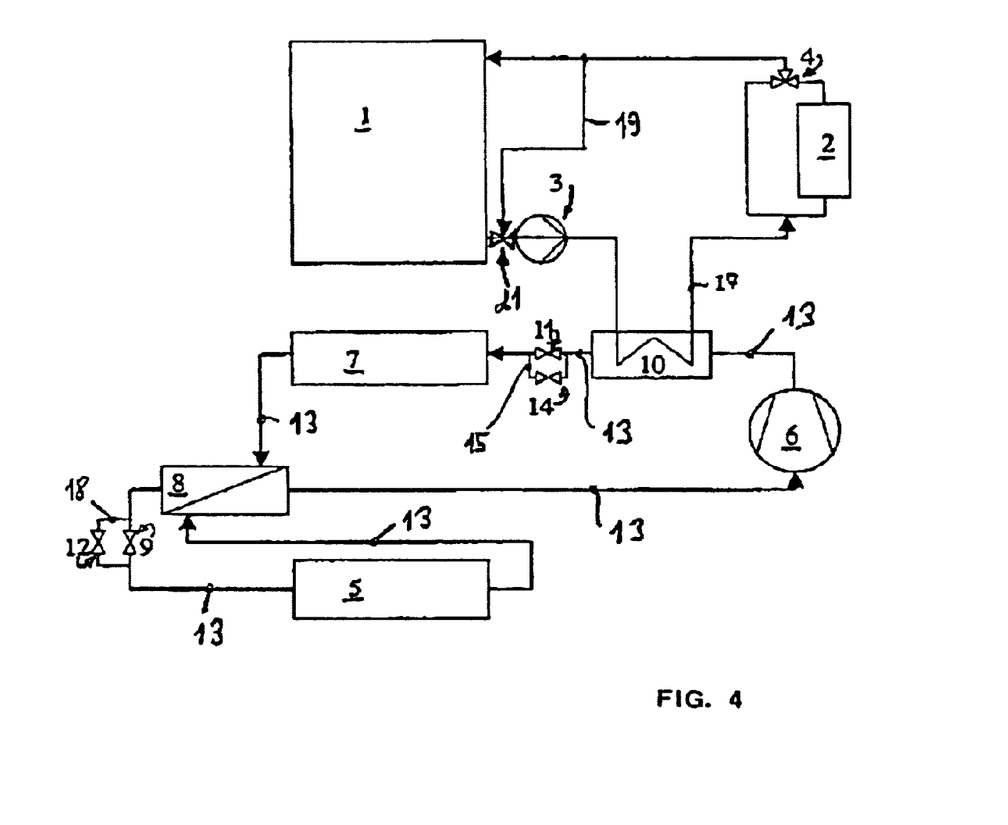

To speed up the heating of the passenger compartment, temporary separation of the hot-water circulation from the engine has proved advantageous, e.g., as shown in FIG. 3 or 4. The heat obtained front the heat pump or the hot-gas bypass circuit is thus used only for heating the small amount of circulating water, which can therefore be rapidly accomplished. Once the temperature of the engine's cooling water has risen sufficiently, the system is switched so that the engine is again included in the cycle and the excess heat it produces is used to heat the interior of the vehicle. To implement this switching a bypass conduit 19 is provided in the hot-water circulation, extending from a point between engine 1 and pump 3 to a point in the return conduit between the heat exchanger 2 used for heating purposes and the engine 1; the switching is enabled by either a two-way valve 20 in the return conduit (FIG. 3 or a two-way valve 21 in the conduit joining engine to pump (FIG. 4).

It is also possible, of course, for the above-mentioned shutoff valves to be made such that they can be put into intermediate positions, depending on the desired operating state.

Figure 5:
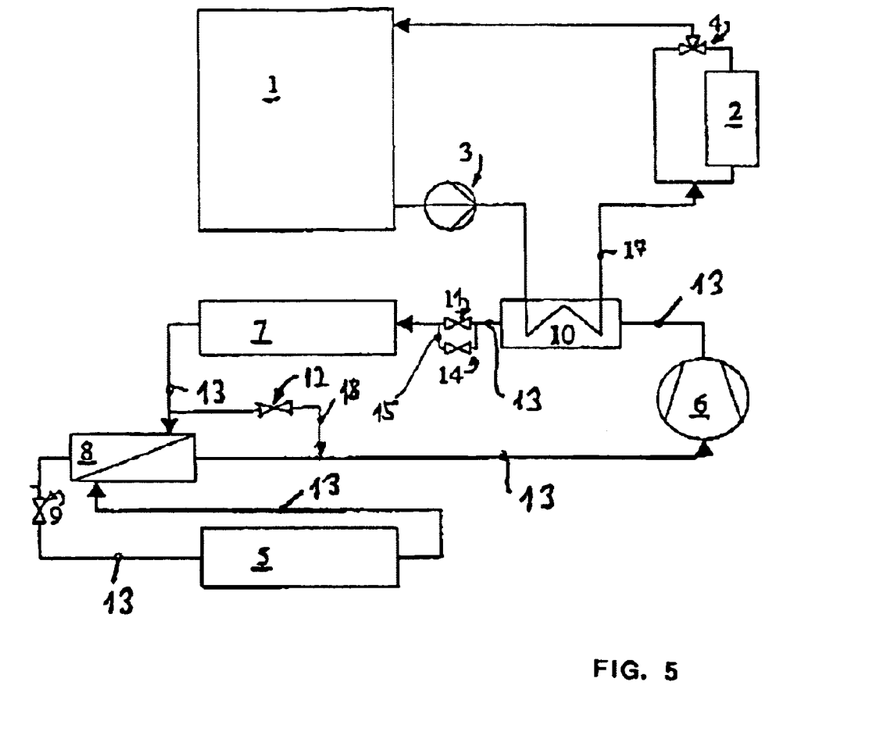
Figure 6:
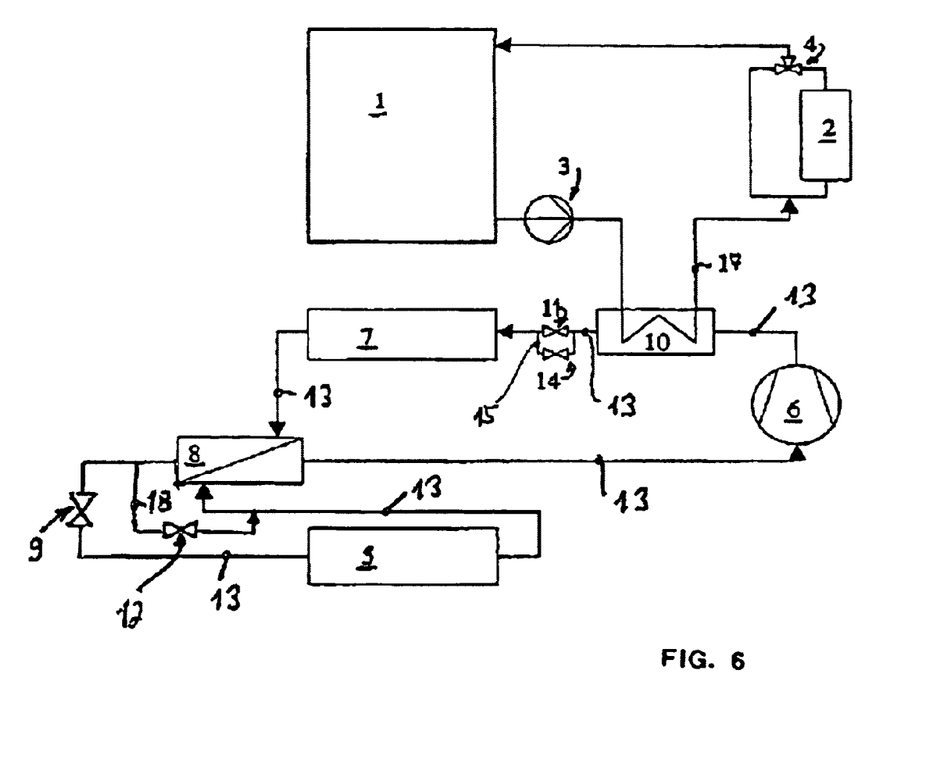

For the reliable prevention of problems associated with flow of gas through the evaporator 5 when the embodiment according to FIG. 1 is operating in heating mode, in FIGS. 5 and 6 a means of bypassing the evaporator 5 is provided. The bypass conduit 18 with bypass valve 12 creates a bridge across either the internal heat exchanger 8 and evaporator 5 (FIG. 5) or the expansion valve and evaporator 5 (FIG. 6), in either case avoiding the evaporator 5.

LIST OF REFERENCE NUMERALS

1. Engine
2. Heat exchanger for heating purposes
3. Pump
4. Two-way valve
5. Evaporator
6. Compressor
7. Heat exchanger or refrigerant cooler
8. Internal heat exchanger
9. Expansion valve
10. Auxiliary heat exchanger
11. Shut-off valve
12. Shut-off valve
13. Refrigerant conduit
14. Expansion valve
15. Bypass conduit
16. Expansion valve
17. Cooling-water circulation
18. Bypass conduit
19. Bypass conduit
20. Two-way valve
21. Two-way valve

What is claimed is:

1. A vehicle air conditioning system utilizing a gaseous refrigerant and capable of operating in a heating or cooling mode comprising:

a compressor (6) for compressing and raising the temperature of the refrigerant, an auxiliary heat exchanger (10) downstream of said compressor (6) to remove heat from the refrigerant and provide heat to the vehicle passenger compartment when the system is operating in the heating mode, a refrigerant cooler (7) downstream of said auxiliary heat exchanger to lower the temperature of the refrigerant, a first valve (11) between said auxiliary heat exchanger (10) and said refrigerant cooler (7) and movable between an open position wherein the system operates in a cooling mode and a closed position wherein the system operates in a heating mode, a first expansion valve (14) between said auxiliary heat exchanger (10) and said refrigerant cooler (7) and disposed in parallel with said first valve (11) whereby when first valve (11) is in a closed position, first expansion valve (14) is operable to reduce the pressure of the refrigerant, a primary heat exchanger (8) downstream of said refrigerant cooler (7), an evaporator (5) downstream of said primary heat exchanger (8), a second valve (12) between said primary heat exchanger (8) and said evaporator (5) and movable between an open position wherein the system operates in a heating mode and a closed position wherein the system operates in a cooling mode, and a second expansion valve (9) between said primary heat exchanger (8) and said evaporator (5) and disposed in parallel with said second valve (12) wherein when second valve (12) is in a closed position second expansion valve (9) is operable to restore vaporization pressure.

* * * * *